(12) United States Patent
Bhadsavle et al.

(10) Patent No.: US 6,789,149 B1
(45) Date of Patent: Sep. 7, 2004

(54) SCHEME TO DETECT CORRECT PLUG-IN FUNCTION MODULES IN COMPUTERS

(75) Inventors: Sandeep Bhadsavle, Austin, TX (US); Daniel W. Kehoe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/491,288

(22) Filed: Jan. 25, 2000

(51) Int. Cl.⁷ .............................................. G06F 13/00
(52) U.S. Cl. ........................................ 710/302; 710/2
(58) Field of Search ...................... 710/100, 300–304, 710/2

(56) References Cited

U.S. PATENT DOCUMENTS

| | | | |
|---|---|---|---|
| 5,462,442 A | * 10/1995 | Umemura et al. | 439/654 |
| 5,568,610 A | 10/1996 | Brown | 395/185.01 |
| 5,589,719 A | * 12/1996 | Fiset | 307/131 |
| 5,590,363 A | 12/1996 | Lunsford et al. | 395/800 |
| 5,636,347 A | * 6/1997 | Muchnick et al. | 710/302 |
| 5,802,328 A | * 9/1998 | Yoshimura | 439/59 |
| 5,862,393 A | * 1/1999 | Davis | 710/302 |
| 5,964,855 A | * 10/1999 | Bass et al. | 710/302 |
| 6,062,480 A | * 5/2000 | Evoy | 235/440 |
| 6,264,483 B1 | * 7/2001 | Wilson | 439/137 |

\* cited by examiner

*Primary Examiner*—Sumati Lefkowitz

(74) *Attorney, Agent, or Firm*—Hamilton & Terrile, LLP; Robert W. Holland

(57) ABSTRACT

A sensing apparatus for detecting a disconnection in a connector for interfacing a component module in a computer system. A first portion of the connector is coupled to the computer system and a second portion of the connector is coupled to a component module in the computer system. The connector portions include electrically conductive portions that mate to enable communication and/or transmission of power signals between the component module and the computer system. One or more sense signals are applied to a predetermined number of electrically conductive portions on the first portion of the connector. A set of corresponding electrically conductive portions on the second portion of the connector are connected to ground. When the connector portions properly mated, the sense signals applied to the first portion of the connector are pulled to ground. A logic circuit provides an output signal indicative of whether the sense signals are pulled to ground on the corresponding set of electrically conductive portions on the first portion of the connector. If the sense signals are pulled to ground, then the logic circuit allows power to be supplied to the component module. When the sense signals are not pulled to ground on any one or more of the corresponding electrically conductive portions on the first portion of the connector, the logic circuit prevents power from being applied to the component module. The circuit will also remove power from the component module if the connector becomes disconnected to the point where the sense signals are not pulled to ground. The output of the logic circuit may also be used to provide an indication to the user that there is a disconnection in the particular connector.

26 Claims, 8 Drawing Sheets

| | |
|---|---|
| 202 | Wake on Ring Connector (Optional) |
| 204 | Yamaha YMF740 (DS1-L) PCI Audio Controller (Optional) |
| 206 | Analog Devices AD1819A SoundPort* Codec (Optional) |
| 208 | Wake on LAN* Technology Connector (Optional) |
| 210 | Legacy CD-ROM Audio Connector |
| 212 | CD-ROM Line In Audio Connector |
| 214 | Telephony Connector (Optional) |
| 216 | Auxiliary Line In Audio Connector (Optional) |
| 218 | Video Line In Audio Connector (Optional) |
| 220 | Back Panel Connector (Optional) |
| 222 | 242-Contact Slot Connector |
| 224 | Active Fan Heatsink (Fan 2) |
| 226 | Intel 82443BX PCI/AGP Controller |
| 228 | DIMM Sockets |
| 230 | Fan 1 Connector |
| 232 | Power Supply Connector |
| 234 | Diskette Drive Connector |
| 236 | SCSI LED Connector (Optional) |
| 238 | IDE Connectors |
| 240 | Front Panel Connectors |
| 242 | Accelerated Graphics Port (AGP) Connector |
| 244 | Intel 82371EB PCI ISA IDE Xcelera (PIIX43) Controller Buscontroller Controller |
| 246 | PC/PCI Connector |
| 248 | Battery |
| 250 | SMSC FDC37M707 Super I/O Contr. |
| 252 | Flash BIOS |
| 254 | Configuration Jumper Block |
| 245 | Integrated Speaker |
| 258 | PCI Connectors |
| 260 | Fan 3 Connector |
| 262 | ISA Connectors |
| 264 | Chassis Intrusion Connector (Optional) |

*Figure 2b*

SCHEME TO DETECT CORRECT PLUG-IN FUNCTION MODULES IN COMPUTERS

BACKGROUND OF THE INVENTION

1. Field of the Invention

This invention relates generally to electrical connectors in computer systems and specifically to a connector coupled to a sensor circuit for indicating when the connector is properly mated.

2. Description of the Related Art

In connector applications for computer systems, it is important to detect when the two halves of a connector have been substantially fully mated so that signals may be transmitted between various components in the system. In computer systems currently being manufactured, modular components are used to simplify assembly. The modules include connectors to interface with the computer system. As the modules increase in complexity and functionality, larger connectors with higher pin count are required. A common problem with the larger connectors is that they are more difficult to connect properly. One common problem is having pins near one or more sides of the connector that are not properly seated in a corresponding socket. The problems that may occur when a connector is not properly seated range from lost signals to damage to hardware components. It is therefore desirable to provide a sensor system for hardware connectors that indicates whether the connectors are properly mated.

Several mechanical devices for indicating whether a connector is properly seated currently exist in the prior art. For example, U.S. Pat. No. 4,906,204 pertains to an electrical connector with a connector position assurance device that slides into a gauge slot of the female connector body only when the connector bodies are properly engaged. U.S. Pat. No. 4,596,431 discloses a coupling indicator for an electrical connector which includes an expandable ring that expands during connector mating to extend outwardly of the external surface of a connector element. A user may touch the ring to determine whether the connector is mated. U.S. Pat. No. 5,605,471 teaches an electrical connector assembly having a connector position assurance device which includes a fin with a flexible locking arm to secure the device to a corresponding electrical connector to secure complete mating of the connector. None of these devices provide electronic sensing that may be integrated with a computer system so that the computer system can prevent certain operations from being performed when it senses that a required device is not properly connected.

U.S. Pat. No. 5,590,363 issued to Lunsford et al. teaches a detection circuit connected to the local bus in a computer system that receives a signal indicating the presence of a co-processor in a socket and outputs a first voltage when the co-processor unit is installed, and a second voltage when the co-processor unit is not installed. The Lunsford et al. device is designed specifically for co-processors and does not disclose a circuit that can be adapted to detect whether the mating portions of a variety of different connectors are properly seated.

U.S. Pat. No. 5,568,610 issued to Brown teaches a detection system for detecting the insertion or removal of expansion cards that have a standard edge connector using one or more capacitive plates coupled to corresponding variable frequency oscillators. The capacitive plates are mounted on an internal layer of the expansion card and are aligned with pins of the edge connector to establish capacitive loading with respect to the pins. The Brown device is designed to sense changes in the frequency of the oscillators and therefore is not capable of detecting whether the mating portions of a connector are properly seated.

SUMMARY OF THE INVENTION

In one embodiment, the present invention provides a sensing apparatus for detecting a disconnection in a connector for interfacing a component module in a computer system. A first portion of the connector is coupled to the computer system and a second portion of the connector is coupled to a component module in the computer system. The connector portions include electrically conductive portions that mate to enable communication between the component module and the computer system. The component module is addressable by the processing unit through a data bus.

To determine whether the connector portions are properly mated, one or more sense electrical signals are applied to one or more electrically conductive portions on the first portion of the connector. Each electrically conductive portion receives a unique signal, referred to herein as "sense signals." A set of corresponding electrically conductive portions on the second portion of the connector are connected to ground. With the connector portions mated, the sense signal(s) applied to the first portion of the connector are overridden by "ground" on the second portion of the connector. Note that there must be one or more electrically conductive portions on the first portion of the connector electrically connected to system ground, and the electrically conductive portions must be mated to electrically conductive portions on the second portion of the connector which in turn are electrically connected to the component ground. A logic circuit provides an output signal indicative of whether the sense signal(s) are pulled to ground on the corresponding set of electrically conductive portions on the second portion of the connector. If the sense signal(s) are pulled to ground, then the logic circuit allows power to be supplied to the component module. When any one of the sense signals are not pulled to ground on any one or more of the corresponding electrically conductive portions on the second portion of the connector, the logic circuit prevents power from being applied to the component module. If the connector becomes partially unmated while power is applied to the module, the logic circuit will detect this and remove power to the module to attempt to prevent damage to the module. The output of the logic circuit may also be used to provide an indication to the user that there is a disconnection in the particular connector.

Several different logic circuits may be used in the present invention including an OR gate, a NOR gate, or a plurality of cascaded logic gates. The present invention may also be used with a variety of connectors including pin/socket type connectors, and tab/slot type connectors.

The foregoing has outlined rather broadly the objects, features, and technical advantages of the present invention so that the detailed description of the invention that follows may be better understood.

BRIEF DESCRIPTION OF THE DRAWINGS

FIG. 2b is a table listing the motherboard connectors in FIG. 2a.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
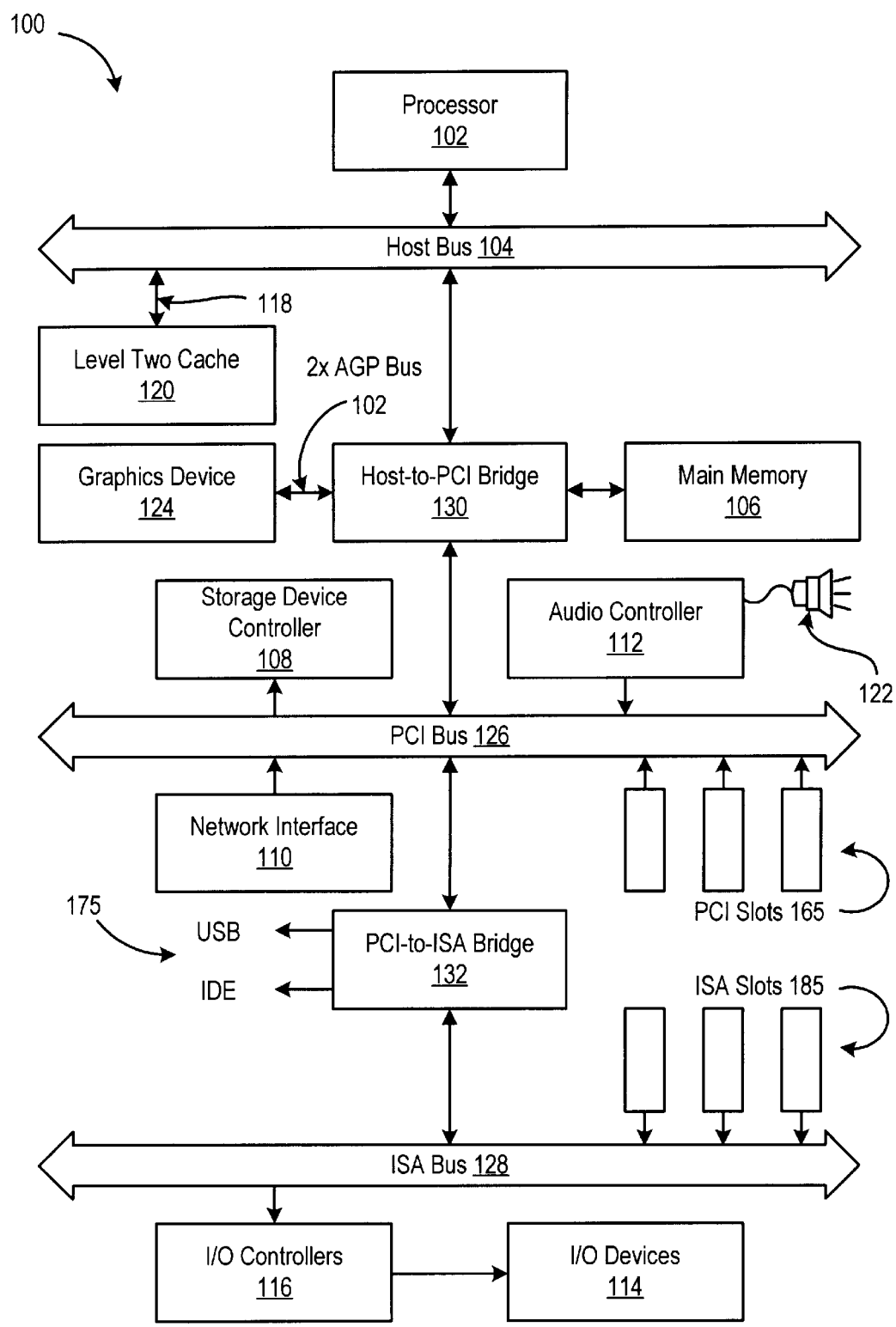
FIG. 1 is a block diagram of an example of a computer system within which the present invention may be utilized.

Referring to FIG. 1, computer system 100 includes a central processing unit (CPU) 102 connected by host bus 104 to various components including main memory 106, storage device controller 108, network interface 110, audio and video controllers 112, and input/output devices 114 connected via input/output (I/O) controllers 116. Those skilled in the art will appreciate that this system encompasses all types of computer systems including, for example, mainframes, minicomputers, workstations, servers, personal computers, Internet terminals, notebooks and embedded systems. Personal computer (PC) systems, such as those compatible with the x86 configuration or Apple power PC system, include desk top, floor standing, or portable versions. Typically computer system 100 also includes cache memory 120 to facilitate quicker access between processor 102 and main memory 106. I/O peripheral devices often include speaker systems 122, graphics devices 124, and other I/O devices 114 such as display monitors, keyboards, mouse-type input devices, floppy and hard disk drives, DVD drives, CD-ROM drives, and printers. The number of devices being added to personal computer systems continues to grow. For example, many computer systems also include network capability, terminal devices, modems, televisions, sound devices, voice recognition devices, electronic pen devices, and mass storage devices such as tape drives. The peripheral devices usually communicate with the processor over one or more buses 104, 126, 128, with the buses communicating with each other through the use of one or more bridges 130, 132. Computer system 100 may be one of many workstations connected to a network such as a local area network (LAN), a wide area network (WAN), or a global information network such as the Internet through network interface 110.

CPU 102 can be constructed from one or more microprocessors and/or integrated circuits. Main memory 106 stores programs and data that CPU 102 may access. When computer system 100 starts up, an operating system program is loaded into main memory 106. The operating system manages the resources of computer system 100, such as CPU 102, audio controller 112, storage device controller 108, network interface 110, I/O controllers 116, and host bus 104. The operating system reads one or more configuration files to determine the hardware and software resources connected to computer system 100.

During operation, main memory 106 includes the operating system, configuration file, and one or more application programs with related program data. Application programs can run with program data as input, and output their results as program data in main memory 106 or to one or more mass storage devices through a memory controller (not shown) and storage device controller 108. CPU 102 executes many application programs, including one or more programs to establish a connection to a computer network through network interface 110. The application programs may be embodied in one executable module or may be a collection of routines that are executed as required.

Storage device controller 108 allows computer system 100 to retrieve and store data from mass storage devices such as magnetic disks (hard disks, diskettes), and optical disks (DVD and CD-ROM). The mass storage devices are commonly known as Direct Access Storage Devices (DASD), and act as a permanent store of information. The information from the DASD can be in many forms including application programs and program data. Data retrieved through storage device controller 108 is usually placed in main memory 106 where CPU 102 can process it.

One skilled in the art will recognize that the foregoing components and devices are used as examples for sake of conceptual clarity and that various configuration modifications are common. For example, audio controller 112 is connected to peripheral component interconnect (PCI) bus 126 in FIG. 1, but may be connected to industry standard architecture (ISA) bus 128 or reside on the motherboard (not shown) in alternative embodiments. As further example, although computer system 100 is shown to contain only a single main CPU 102, those skilled in the art will appreciate that the present invention may be practiced using a computer system that has multiple CPUs 102. In addition, the interfaces that are used in the preferred embodiment may include separate, fully programmed microprocessors that are used to off-load computationally intensive processing from CPU 102, or may include input/output (I/O) adapters to perform similar functions. Further, PCI bus 126 is used as an example of any input-output devices attached to any I/O bus; AGP bus 102 is used as an example of any graphics bus; graphics device 124 is used as an example of any graphics controller; and host-to-PCI bridge 130 and PCI-to-ISA bridge 132 are used as examples of any type of bridge. Consequently, as used herein the specific exemplars set forth in FIG. 1 are intended to be representative of their more general classes. In general, use of any specific example herein is also intended to be representative of its class and the non-inclusion of such specific devices in the foregoing list should not be taken as indicating that limitation is desired.

Figure 2A:
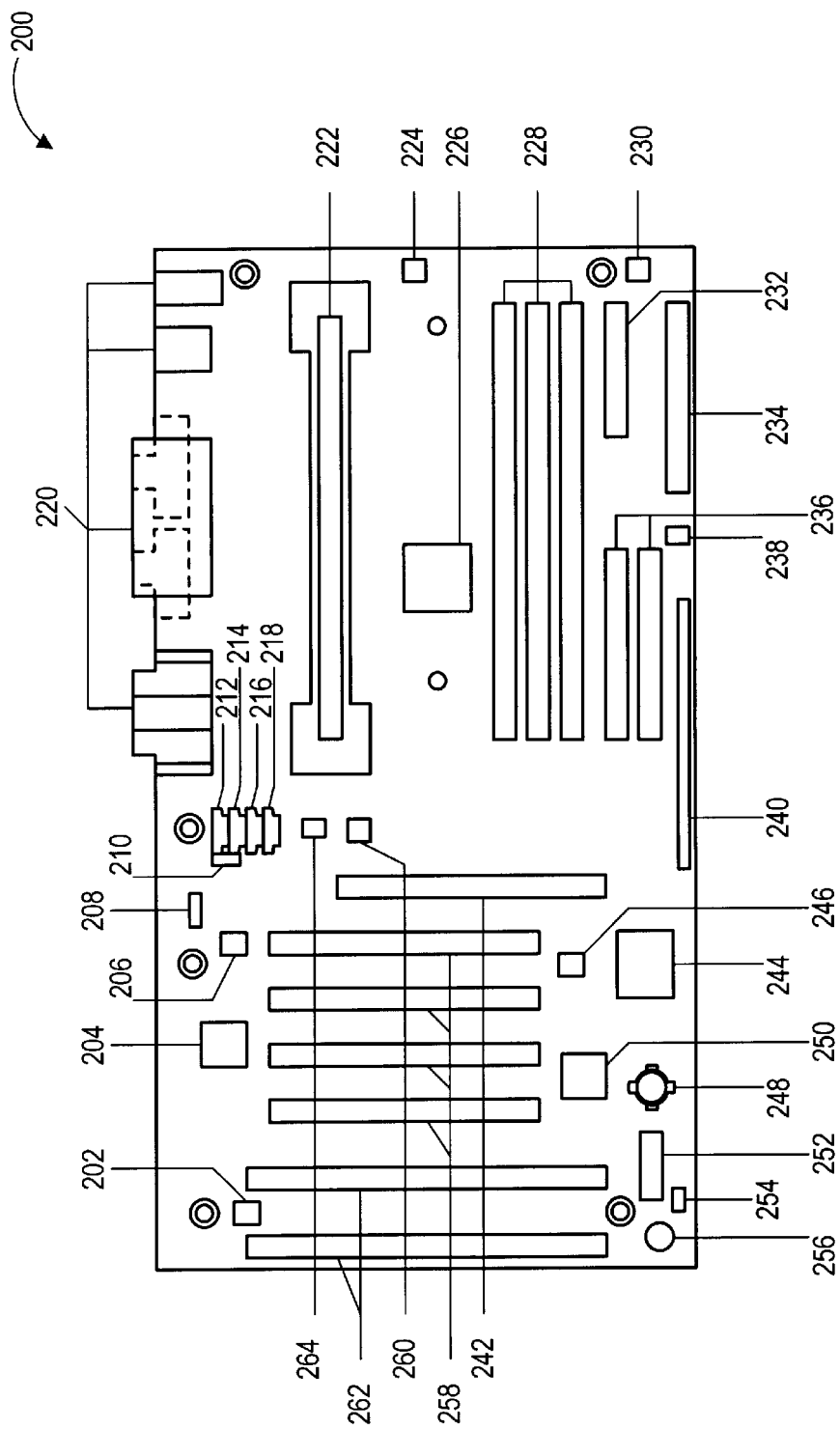
FIG. 2a is a diagram of a motherboard with various connectors with which the present invention may be utilized.

The components that are included in computer system 100 are often designed as modular components that may be purchased from different manufacturers and connected to computer system 100 through standard interface connectors. FIG. 2a shows an example of a motherboard 200 for computer system 100 having various connector portions that mate with corresponding connector portions on the component modules. FIG. 2b shows a table that lists the type of component that typically plugs into the corresponding connector portion as labeled on motherboard 200 in FIG. 2a.

Figure 2C:
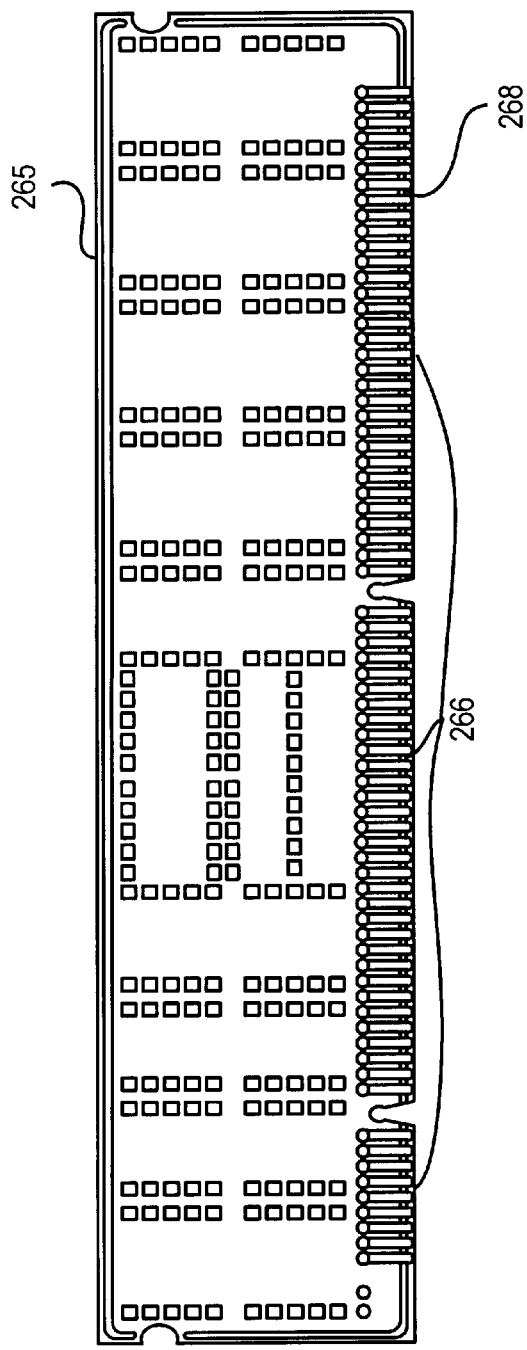
FIGS. 2c through 2f show examples of various types of connectors with which the present invention may be utilized.

FIGS. 2c through 2h show examples of various types of connectors that mate with connector portions on motherboard 200. FIG. 2c shows a 168 pin dual in-line memory module (DIMM) package 265 having tab portions 266 that mate with connector portion 228, also known as DIMM socket 228. DIMM socket 228 has a slot (not shown) that is lined on both sides with portions of electrically conductive material to form individual electrical contacts. Tab portions 266 also have a plurality of electrical contacts 268 that correspond to the electrical contacts in DIMM socket 228. When tab portions 266 are inserted in DIMM socket 228, electrical communication is established with signal traces on motherboard 200 that are connected between DIMM socket 228 and a data processor such as CPU 102 (FIG. 1) or a memory controller.

Figure 2D:
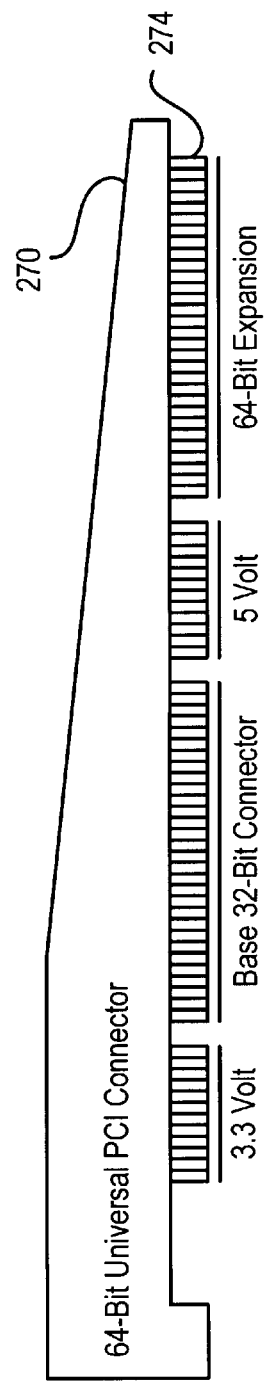

FIG. 2d shows an example of a board that uses another type of connector, known as a 64-bit universal PCI edge connector board 270. PCI connectors 258 allow PCI bus 126 to be extended off motherboard 200, thereby saving space on motherboard 200. Each PCI connector 258 can be filled by a PCI edge connector board 270 containing a number of functional units. PCI includes three different types of boards, namely 5 volt, 3.3 volt, and the universal board that combines 3.3 volt and 5 volt as shown in FIG. 2*d*. PCI board 270 includes tab portions 274 with a plurality of electrical contacts 268 that correspond to the electrical contacts in PCI connectors 258, which are constructed similar to DIMM socket 228 as a slot (not shown) that is lined on both sides with portions of electrically conductive material to form individual electrical contacts. When tab portions 274 are inserted in PCI connectors 258, electrical communication is established with signal traces on motherboard 200 that are connected between PCI connectors 258 and a data processor such as CPU 102 or bus controller 244.

Figure 2E:
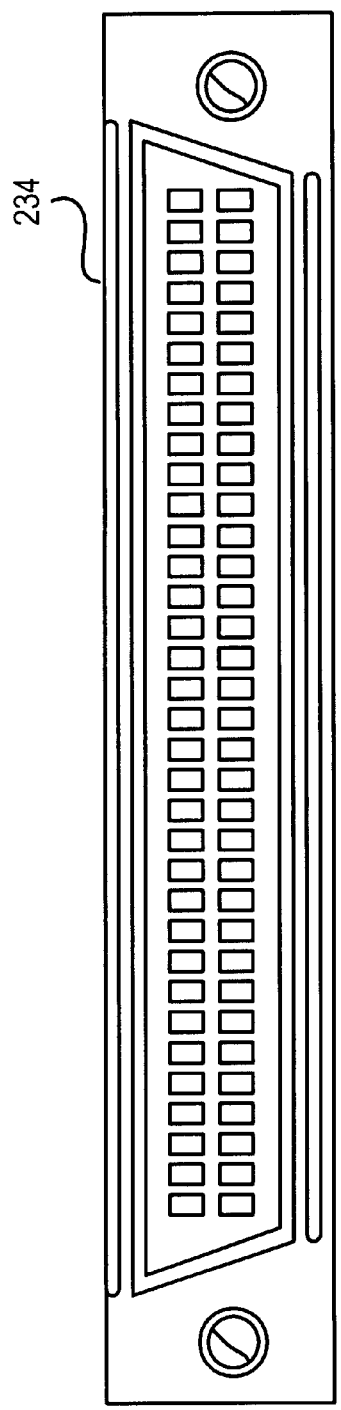
Figure 2F:
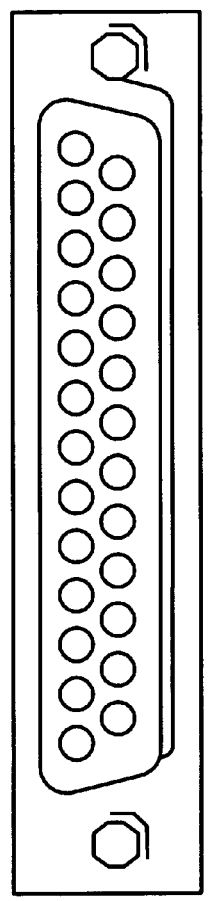

FIG. 2*e* shows an example of a small computer systems interface (SCSI) connector 234 for interfacing a variety of modular components, such as hard disk drives, CD-ROM players, scanners, and disk drive arrays, to computer system 100. SCSI functions like a sub-bus in computer system 100 and SCSI devices can exchange data among themselves without the intervention of CPU 102. SCSI expansion capability is provided by a system that includes a software command structure that allows CPU 102 to control SCSI hardware, a software protocol to move the commands through the SCSI system to various SCSI devices, and SCSI hardware including ports, cables, and connectors that link SCSI devices to computer system 100 by daisy-chaining connections between devices. SCSI uses a wide variety of known connectors for both internal and external devices including a 50-place pin connector, a 68-place pin connector 234 as shown in FIG. 2*e*, an A connector, and a D-shell connector as shown in FIG. 2*f*. One side of a SCSI connector includes pin portions (not shown) that conduct electrical signals and correspond to electrical contacts in the socket portions of SCSI connector 234. When the pin portions 274 are inserted in the socket portion, electrical communication is enabled with signal traces on motherboard 200 that are connected between SCSI connector 234 and a data processor such as CPU 102.

Figure 2G:
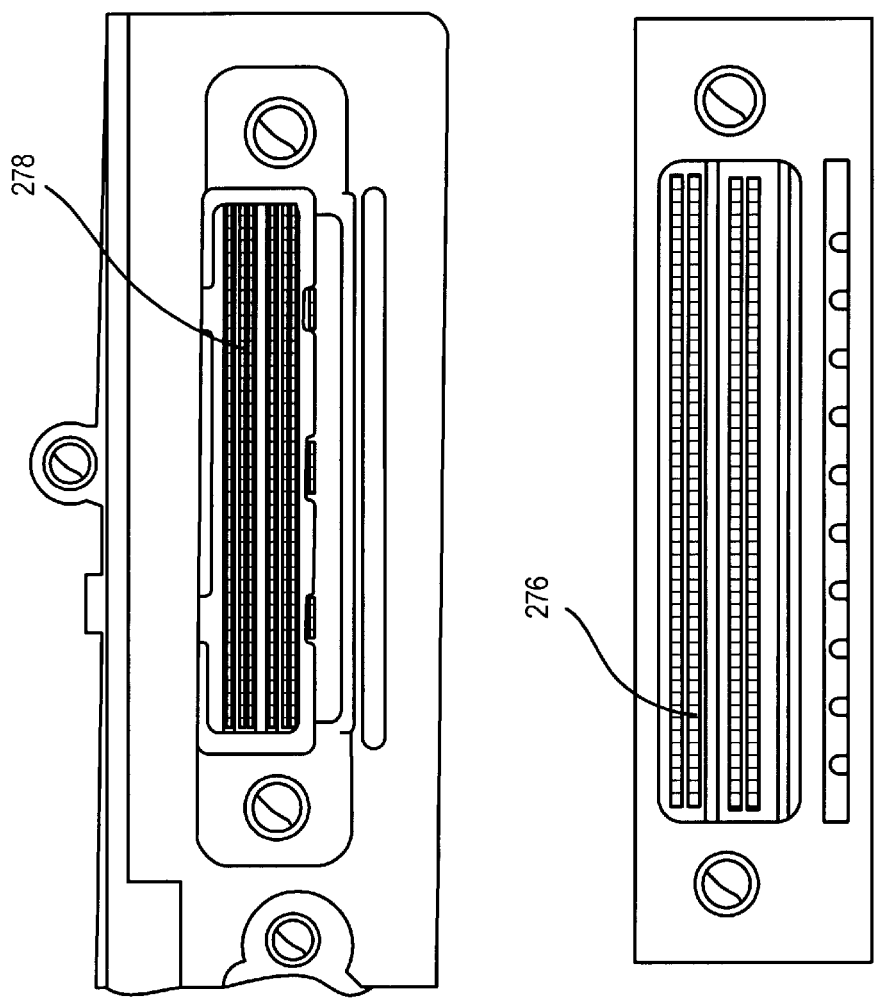

FIG. 2*g* shows a docking connector used to dock a notebook computer to a docking station having tabs 276 and slots 278. Since the docking station and the notebook are complete computer systems by themselves, the docking connector provides an interface between the computer systems and transmits signals such as PCI-to-PCI and PCI-to-ISA bridge transactions, power and power management signals, memory interface, and docking control signals between the computers.

Figure 2H:
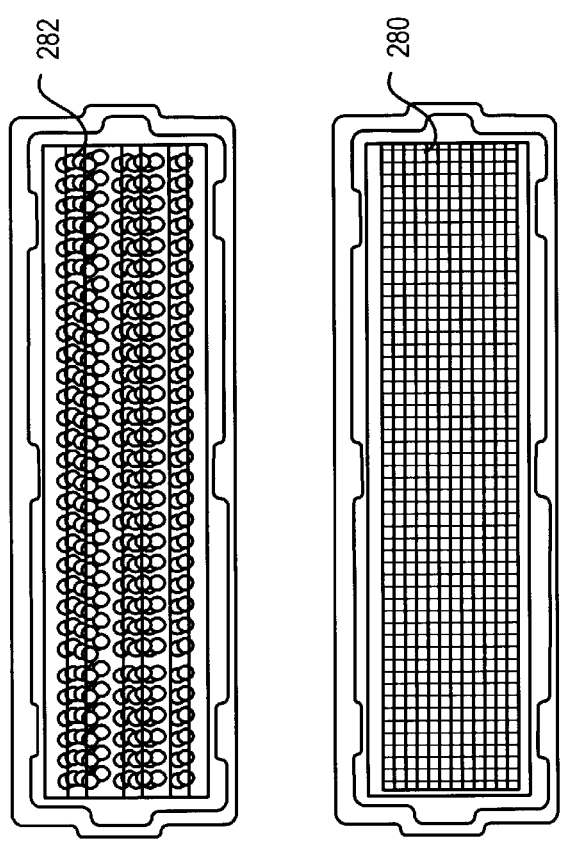

FIG. 2*h* shows a mobile module connector 2 (MMC-2) that connects Intel Pentium III processor mobile modules with a motherboard. The mobile module is an integrated assembly that includes a mobile processor core, a system-level support chipset, PCI/ISA and host bridges to interface with memory controllers and system clocks, a voltage regulator, and active thermal feedback sensing. There are 400 pins on connector portion 280 that correspond to 400 holes on connector portion 282.

The connectors shown in FIGS. 2*c* through 2*h* are just some of the different types of connectors that are utilized to connect various component modules to computer system 100. As shown for example in FIG. 2*c*, some of the connectors have numerous electrical contacts that must be aligned and substantially fully mated to enable proper operation and communication with the component in computer system 100. Further, connectors having long, relatively thin structures, such as single edge connectors on PCI boards 270 and memory modules 265, may be subject to bowing and flexing effects, thereby preventing contact between two the mating portions of the connector. Importantly, the present invention may be implemented with various types, sizes, and shapes of connectors.

In one embodiment, the present invention provides a sensing apparatus for detecting a disconnection between a first portion of a connector and a second portion of the connector. A disconnection may occur when the connector portions are not fully inserted, or mated, with one another, or when a connector portion is bowed or flexed. In this disclosure, a first portion of the connector denotes the portion of the connector that is mounted on motherboard 200, such as shown by connector portions 202 through 264 in FIGS. 2*a* and 2*b*. A second portion of the connector denotes the portion of the connector that is attached to a component module added to computer system 100 (FIG. 1), and which plugs into the first connector portion on motherboard 200, or in some other location.

Figure 3:
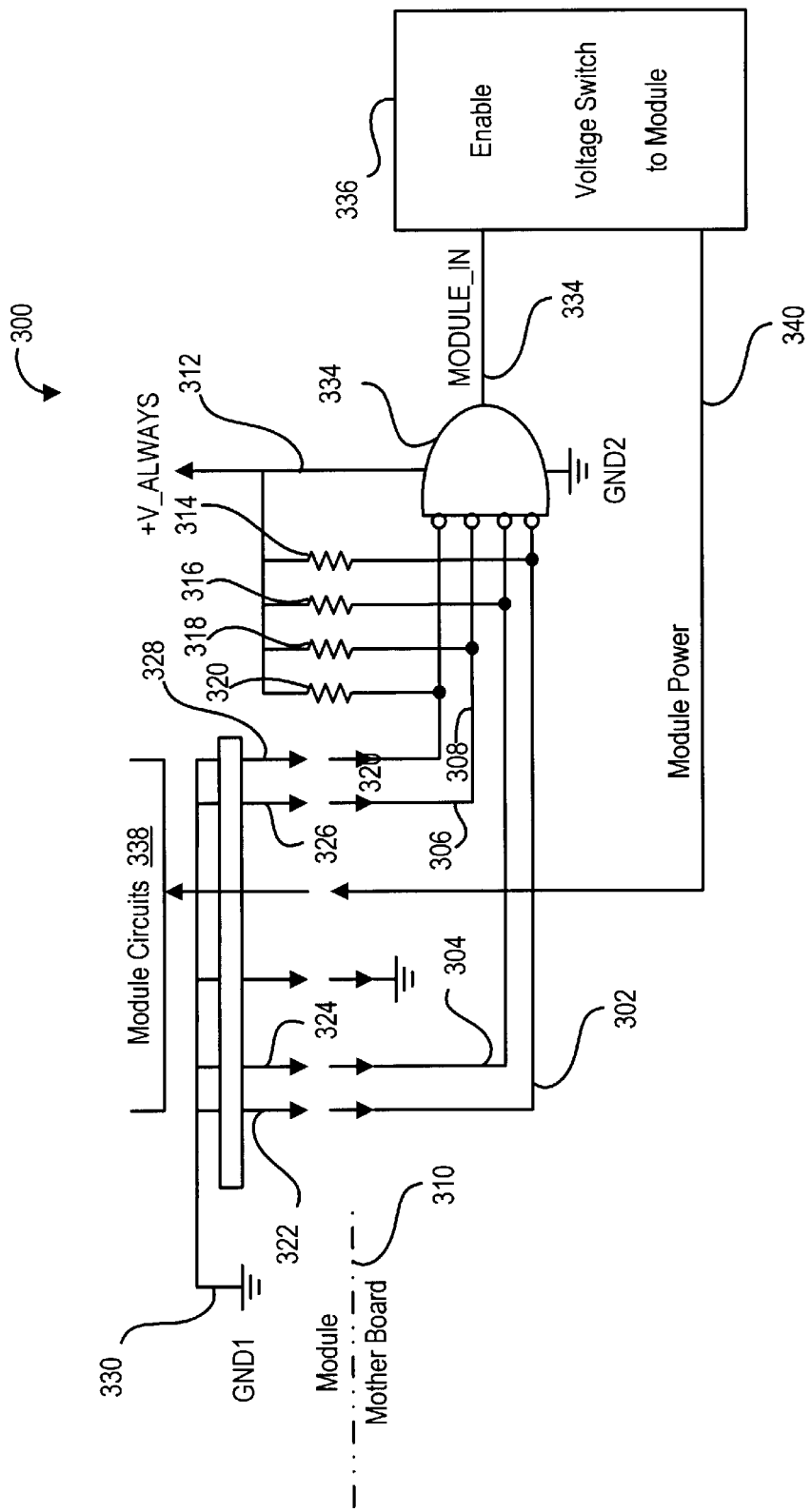
FIG. 3 is a schematic diagram of one embodiment of a logic circuit according to the present invention.

FIG. 3 shows a schematic diagram of one embodiment of detection circuit 300 according to the present invention including electrically conductive signal lines 302 through 308 connected to motherboard 310 of computer system 100 and which are assigned to be sense signals. A live supply rail voltage line 312 having a known value, such as 5 volts, is applied to signal lines 302 through 308 through resistors 314 through 320, respectively. Signal lines 302 through 308 are coupled to electrically conductive signal lines 322 through 328 through corresponding electrically conductive portions of a connector, such as one of the connectors shown in FIGS. 2*c* through 2*h*. Signal lines 322 through 328 are connected on the other end to ground 330.

Signal lines 302 through 308 reside on motherboard 310 and provide input to logic circuit 332. Logic circuit 332 provides module-in signal 334 to module power source 336. When all signal inputs to logic circuit 332 are pulled logically low through a good ground connection, then signal module-in 334 will be low. Module power source 336 includes logic that provides power to module circuit 338 through module power signal 340 when the connector is properly mated (i.e., when signal lines 302 through 308 are pulled to ground). Accordingly, a variety of different logic circuits 332 known in the art may be implemented in the present invention, with an OR gate and a NOR gate being two possibilities. A plurality of cascaded logic gates may also be implemented to provide the functionality of logic circuit 332.

The present invention thus provides an apparatus and method that can be used to generate module-in signal 334 that indicates when both portions of a connector to couple signal lines 302 through 308 to signal lines 322 through 328 is properly mated. When one or more of signal lines 302 through 308 is not properly coupled through a connector to corresponding signal lines 322 through 328, module-in signal 334 will indicate an improper mating. Module-in signal 334 may be used to determine when power may be applied to module circuits 338. Further, module-in signal 334 is operable to indicate an improper mating both before power is ever applied to module circuits 338, as well as during operation of computer system 100 when even a portion of a connector couple one or more of signal lines 302 through 308 to signal lines 322 through 328 becomes disconnected.

The present invention is also operable to detect improper mating due to flexing and bowing effects, in addition to disconnection or improper mating of the two portions of the connector.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for applying power to a component module in a computer system, the computer system including a connector for coupling the component module to signals from the computer system, the connector having a first mating portion and a second mating portion, the method comprising:

connecting the first mating portion of the connector with the second mating portion of the connector;

providing plural sense signals to the first mating portion of the connector, each sense signal comprising a distinct electrical signal to each of a predetermined number of the electrically conductive portions of the first mating portion;

determining whether the first mating portion is connected to the second mating portion by sensing the state of the sense signal on the first portion of the connector; and applying power to the component module based on whether the sense signal changes state on the first portion of the connector by sending a single output signal to a power source associated with the first portion.

2. The method of claim 1 wherein the first mating portion of the connector includes electrically conductive portions and the second mating portion of the connector includes electrically conductive portions that correspond to the electrically conductive portions of the first mating portion, the electrically conductive portions being positioned to establish contact when the first mating portion is operably connected to the second mating portion.

3. The method of claim 2 wherein determining whether the first mating portion is connected to the second mating portion by sensing the state of the sense signal on the first portion of the connector includes connecting a corresponding plurality of the electrically conductive portions of the second portion of the connector to ground and sensing whether the signals on the corresponding electrically conductive portions are pulled to ground.

4. The method of claim 3 wherein applying power to the component module based on whether the signal changes state on the first portion of the connector includes inputting the signals from the electrically conductive portions of the first portion of the connector to a logic circuit, and outputting a signal from the logic circuit indicating that power should be applied to the module when the signals on the corresponding electrically conductive portions are pulled to ground.

5. The method of claim 3 wherein sensing whether the signals on the corresponding electrically conductive portions are pulled to ground includes inputting the signals from the electrically conductive portions of the second portion of the connector to an OR gate.

6. The method of claim 3 wherein sensing whether the signals on the corresponding electrically conductive portions are pulled to ground includes inputting the signals from the electrically conductive portions of the second portion of the connector to a NOR gate.

7. The method of claim 3 wherein sensing whether the signals on the corresponding electrically conductive portions are pulled to ground includes inputting the signals from the electrically conductive portions of the second portion of the connector to a plurality of cascaded logic gates.

8. The method of claim 1 wherein the first mating portion of the connector includes a plurality of sockets and the second mating portion of the connector includes a plurality of pins, and connecting the first mating portion of the connector into the second mating portion of the connector includes inserting the pins into the sockets.

9. The method of claim 8 wherein providing a sense signal to the first mating portion of the connector includes applying an electrical signal to a predetermined number of the pins.

10. The method of claim 9 wherein determining whether the first mating portion is connected to the second mating portion by sensing the state of the sense signal on the first portion of the connector includes connecting a corresponding plurality of the sockets to ground and sensing whether the signal on the signal on the first portion of the connector is pulled to ground.

11. The method of claim 1 wherein the first mating portion of the connector includes a slot having electrically conductive portions and the second mating portion of the connector includes a tab having electrically conductive portions, and connecting the first mating portion of the connector into the second mating portion of the connector includes inserting the tab into the slot.

12. The method of claim 11 wherein providing a sense signal to the first mating portion of the connector includes applying distinct electrical signals to each of a plurality of the portions of electrically conductive material in the slot.

13. The method of claim 12 wherein determining whether the first mating portion is connected to the second mating portion includes connecting a corresponding plurality of the electrically conductive portions on the tab to ground and sensing whether the signal on the first portion of the connector is pulled to ground.

14. A sensing apparatus for detecting a connection between a first portion of a connector in a computer system and a second portion of the connector in a component module, the apparatus comprising:

a first set of electrically conductive portions on the first portion of the connector;

means for applying a sense signal to a predetermined number of electrically conductive portions on the first portion of the connector, each electrically conductive portion receiving a distinct signal;

a second set of electrically conductive portions on the second portion of the connector corresponding to the predetermined number of electrically conductive portions on the first portion of the connector, wherein the corresponding second set of electrically conductive portions are connected to ground; and a logic circuit connected to the first set of electrically conductive portions, the logic circuit being operable to provide a single output signal indicative of whether the sense signal applied to the electrically conductive portions on the first portion of the connector are pulled to ground when the first portion of the connector is mated with the second portion of the connector.

15. The sensing apparatus of claim 14 wherein the logic circuit is an OR gate.

16. The sensing apparatus of claim 14 wherein the logic circuit is a NOR gate.

17. The sending apparatus of claim 14 wherein the logic circuit is a plurality of cascaded logic gates.

18. The sensing apparatus of claim 14 wherein the first set of electrically conductive portions includes a plurality of pins and the corresponding second set of electrically conductive portion includes a plurality of sockets.

19. The sensing apparatus of claim 14 wherein the first set of electrically conductive portions are provided in a slot and the corresponding second set of electrically conductive portions are provided in a tab.

20. A computer system having a sensing apparatus for detecting a connection between a first portion of a connector and a second portion of the connector on a component module that plugs into the first portion of the connector, the computer system comprising:

a first set of electrically conductive portions on the first portion of the connector;

means for applying a sense signal to a predetermined number of electrically conductive portions on the first portion of the connector, each sense signal being a distinct signal distributed across the connector to detect improper mating due to flexing and bowing effects;

a second set of electrically conductive portions on the second portion of the connector corresponding to the predetermined number of electrically conductive portions on the first portion of the connector, wherein the corresponding second set of electrically conductive portions are connected to ground; and a logic circuit coupled to the first set of electrically conductive portions, the logic circuit being operable to provide a single output signal indicative of whether the sense signal applied to the first set of electrically conductive portions on the first portion of the connector are pulled to ground when the first portion of the connector is mated with the second portion of the connector.

21. The computer system of claim 20 wherein the logic circuit is coupled to a power circuit, the power circuit being operable to supply voltage to the component module when the sense signal applied to the first set of electrically conductive portions on the first portion are pulled to ground.

22. The computer system of claim 20 wherein the logic circuit is an OR gate.

23. The computer system of claim 20 wherein the logic circuit is a NOR gate.

24. The computer system of claim 20 wherein the logic circuit is a plurality of cascaded logic gates.

25. The computer system of claim 20 wherein the first set of electrically conductive portion includes a plurality of pins and the corresponding second set of electrically conductive portions includes a plurality of sockets.

26. The computer system of claim 20 wherein the first set of electrically conductive portions are provided in a slot and the corresponding second set of electrically conductive portions are provided in a tab.

* * * * *